United States Patent [19]
Hatfield, Jr. et al.

[11] 3,857,871
[45] Dec. 31, 1974

[54] PROCESS FOR REDUCING THE ACIDITY AND HYDROLYZABLE CHLORIDE CONTENT OF POLYISOCYANATES

[75] Inventors: Richard Hatfield, Jr., Pasadena; Howard R. Steele, Baytown, both of Tex.

[73] Assignee: The Upjohn Company, Kalamazoo, Mich.

[22] Filed: Jan. 3, 1972

[21] Appl. No.: 214,829

[52] U.S. Cl. ............................................. 260/453 SP
[51] Int. Cl. ............................................. C07c 119/04
[58] Field of Search ............................... 260/453 SP

[56] References Cited
UNITED STATES PATENTS
3,219,678   11/1965   Kober et al. ..................... 260/453
3,549,504   12/1970   Adica et al. ..................... 260/453 X Primary Examiner—Lewis Gotts
Assistant Examiner—Dolph H. Torrence
Attorney, Agent, or Firm—Denis A. Firth; John Kekich

[57] ABSTRACT

The acidity and hydrolyzable chloride levels of polymethylene polyphenyl polyisocyanates are reduced (and the reactivity correspondingly increased) by exposing the polyisocyanate in a liquid state at 350°F to 450°F to countercurrent treatment with an inert gas (nitrogen preferred) at substantially atmospheric pressure. Preferably, the treatment is conducted in a packed column with the polyisocyanate flowing downwardly. The treatment is particularly well adapted for use as a step in a continuous process for the preparation of isocyanates.

2 Claims, 1 Drawing Figure

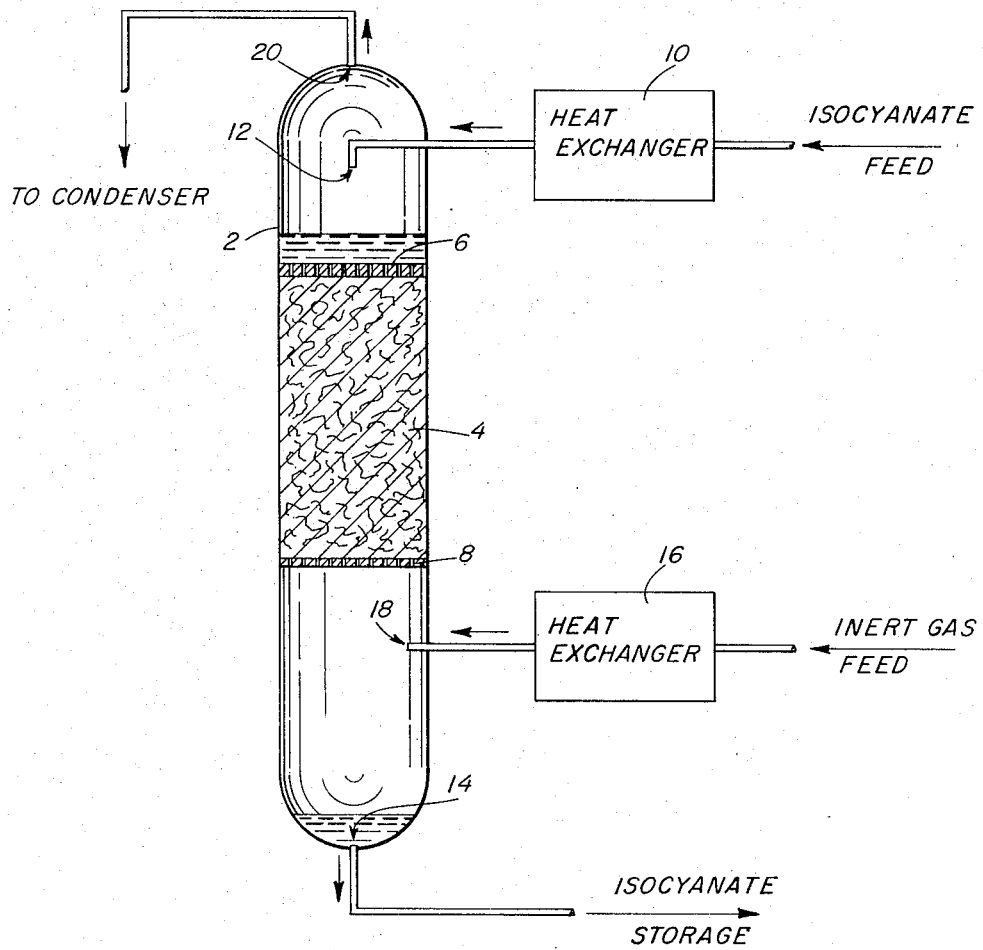

PROCESS FOR REDUCING THE ACIDITY AND HYDROLYZABLE CHLORIDE CONTENT OF POLYISOCYANATES

BACKGROUND OF THE INVENTION

1. Field of the Invention

This invention relates to improvements in the preparation of polyisocyanates and, more particularly, is concerned with a continuous process for reducing the acidity and hydrolyzable chloride levels in polymethylene polyphenyl polyisocyanates.

2. Description of the Prior Art

It is well recognized in the art that the presence of free hydrogen chloride and a wide variety of by-products containing hydrolyzable chloride, produced during the preparation of polyisocyanates by phosgenation of the corresponding amines, has an adverse effect on the rate of reaction of polyisocyanates with active hydrogen-containing materials such as polyols. This is particularly so in the case of polymethylene polyphenyl polyisocyanates, i.e., the products derived by phosgenation of the mixture of polyamines obtained in the acid condensation of aniline and formaldehyde.

Various methods of adjusting the reactivity and/or lowering the hydrolyzable chloride content of such polyisocyanates have been described. For example, the addition of various metals as well as metal salts and organometallic derivatives has been suggested; U.S. Pat. Nos. 3,155,699; 3,264,336; 3,373,182; and 3,458,558. Fractional distillation to achieve the above objects is described in U.S. Pat. No. 3,264,336 and a combination of fractional distillation under reduced pressure and purging with inert gas is described in U.S. Pat. No. 3,549,504. U.S. Pat. No. 3,516,950 discloses passing an inert gas through heated polyisocyanate as a means of reducing hydrolyzable chloride.

It is highly desirable that reduction of the acidity and hydrolyzable chloride content of polymethylene polyphenyl polyisocyanate be accomplished without the addition of extraneous materials such as are disclosed by the art. For many of the uses to which the polyisocyanates are put, the presence of such extraneous material is deleterious and the requisite separation of isocyanate and additive prior to use is not economical. Accordingly, attention has been directed to processes which do not involve addition of materials to the isocyanate. Unfortunately, all of the methods of this type so far described in the art have the drawback of being unduly complex and therefore uneconomical, or of requiring prolonged exposure of the isocyanate to elevated temperatures. The latter results in some degradation and-/or polymerization of isocyanate with resultant, and frequently undesirable, increase in viscosity.

We have now discovered that the hydrolyzable chloride content and/or acidity of polyisocyanates and more particularly of polymethylene polyphenyl polyisocyanates can be reduced in a simple and economical manner without any significant change in viscosity or oligomeric distribution caused by excessive exposure to elevated temperatures.

SUMMARY OF THE INVENTION

This invention comprises a process for lowering the acidity and hydrolyzable chloride content of a polyisocyanate which process comprises exposing said polyisocyanate, in a liquid state at a temperature in the range of about 350°F to about 450°F and below the boiling point of said polyisocyanate, to countercurrent treatment with an inert gas at substantially atmospheric pressure.

DESCRIPTION OF THE DRAWINGS

The FIGURE shows a schematic representation of one embodiment of the process of the invention.

DETAILED DESCRIPTION OF THE INVENTION

The "acidity" or "acid value", sometimes referred to as "hot acidity", of a polyisocyanate is a term well recognized in the art. The acidity is determined by potassium hydroxide titration of the free acid generated upon subjecting a measured quantity of polyisocyanate to a brief period of heating in methanol. The "hydrolyzable chloride" content of a polyisocyanate is also a well-recognized parameter which is determined by estimation (by silver nitrate titration) of the chloride ion generated by boiling a measured amount of polyisocyanate in a mixture of toluene and methanol.

The process of the invention can be carried out using apparatus and procedures conventional in the art of subjecting fluids to countercurrent absorption or desorption. Illustratively, the polyisocyanate is preheated to the desired temperature and fed to the top of a column down which the liquid polyisocyanate is allowed to flow under gravity. Simultaneously, the inert gas is fed to a point in the column lower than that at which the polyisocyanate is introduced. The inert gas passes upwardly through the column in contact with the liquid polyisocyanate and exits from the top of the column. Some of the more volatile component or components of the polyisocyanate (the nature of these components will vary depending upon the particular polyisocyanate employed) will become entrained in the inert gas stream. Accordingly, it is advantageous to pass the inert gas, as it exits from the top of the column, to a condenser or like apparatus in which the volatile components removed from the polyisocyanate are separated from the entraining gas.

In order to ensure that the inert gas and the heated liquid polyisocyanate come into intimate contact during the counter-current treatment in the column, it is preferred that the latter be packed at least for part of its length. The term "packed" is used in the sense in which it is normally employed in the fractional distillation art, i.e. as meaning that packing material such as Raschig rings, helices, wire mesh, Intalox saddles, Flexirings, and the like, are inserted in the column to disperse the liquid passing down the column into a plurality of streams and thereby increase the possibility of intimate contact between vapor and liquid passing countercurrently through the column. Alternatively, but less preferably, the column employed in the process of the invention is provided with plates or trays such as bubble cap trays, valve trays and sieve trays (also known as perforated trays) and the like, commonly employed in the distillation art.

The amount of packing in the column, or the number of trays employed therein, can be varied over a wide range depending upon the desired hold-up time in the column. The appropriate degree of packing can be determined readily in any given instance by a process of trial and error.

In carrying out the process of the invention, the organic polyisocyanate which is to be treated is preheated to a temperature which is below the boiling point of the polyisocyanate or, where the polyisocyanate is a mixture of oligomers, below the boiling point of the most volatile component of the mixture.

Advantageously, the feed polyisocyanate is heated to a temperature within the range of about 350°F to about 450°F and preferably to a temperature within the range of about 375°F to about 430°F before being fed to the head of the treatment column.

Similarly, the inert gas employed in the process of the invention is advantageously heated to a temperature within the same range as that of the feed polyisocyanate before being introduced countercurrently to the polyisocyanate in the treatment column.

The average residence time of the polyisocyanate in the treatment columnn required in any given instance to achieve a desired reduction in acidity and/or hydrolyzable chloride content can be determined by a process of trial and error. In general, residence times of the order of about 1 minute to about 10 minutes are satisfactory depending upon the rate at which the inert gas is passed countercurrently to the feed isocyanate and also depending on the temperature at which the polyisocyanate is introduced into the treatment column. Preferably, the conditions in the column, including the amount of packing and feed rates of isocyanate and inert gas, are so ordered that the average residence time is within the range of about 2 minutes to about 5 minutes thereby reducing to a minimum any degradation, polymerization or other changes in the polyisocyanate caused by exposure of this heat-sensitive material to elevated temperatures.

The process of the invention can be applied to the reduction of acidity and/or hydrolyzable chloride content in any organic polyisocyanate. Illustrative of such organic isocyanates are toluene diisocyanate, including the 2,4- and 2,6-isomers as well as mixtures thereof, methylenebis(phenyl isocyanate) including the 4,4'-, 2,4'-, and 2,2'-isomers and mixtures thereof; methylenebis(cyclohexylisocyanate) including the 4,4'-, 2,4'-, and 2,2'-isomers and mixtures thereof, o-tolidine diisocyanate (3,3'-dimethyl-4,4'-diisocyanatodiphenyl), hexamethylene diisocyanate, xylidine diisocyanate and the like. The process of the invention is particularly applicable to the reduction of acidity and/or hydrolyzable chloride content of methylenebis(phenyl isocyanate) in any of the isomeric forms set forth above or in the form of mixtures with higher oligomeric polymethylene polyphenyl polyisocyanates. The latter mixtures are well known in the art and are generally obtained by phosgenation of the corresponding mixtures of polyamines which have themselves been derived by acid condensation of aniline and formaldehyde. Such mixtures of polymethylene polyphenyl polyisocyanates generally contain from about 35 to about 85 percent by weight of methylenebis(phenyl isocyanate), the remainder of said mixture being polymethylene polyphenyl polyisocyanates of higher functionality.

The inert gas which is employed in the process of the invention can be any gas which does not react with a polyisocyanate under the conditions of the process. Illustrative of such gases are nitrogen, argon, krypton, carbon dioxide and the like. The preferred inert gas is nitrogen.

The process of the invention will now be illustrated further by reference to the accompanying FIGURE. The latter shows a flow sheet illustrating a typical process carried out in accordance with the invention. The column 2 is provided with packing 4 which is supported by perforated retaining plate 8. The packing can take a variety of forms such as Raschig rings, wire mesh, ceramic pieces such as those sold under the name Intalox saddles, marble chips, and metallic rings such as those sold under the name of Flexirings or Pall rings. The material of construction should be inert to the polyisocyanate and noncatalytic to decomposition reactions of the polyisocyanate. The organic polyisocyanate feed is introduced, via a heat exchanger 10 in which it is preheated to the desired temperature within the range set forth above, to the head of the column via inlet port 12. Depending on the cross-sectional diameter of the column 2 there can be provided as an optional feature a liquid spreading device 6 to assist in distributing the feed polyisocyanate substantially uniformly over the packing 4. Where the column is of cross-sectional diameter less than about 12 inches, such a distributing device is generally found to be unnecessary. Liquid spreading device 6 and retaining plate 8 may be of any design normally employed in the fractional distillation or absorption arts.

The feed polyisocyanate is allowed to flow downwardly through the packing 4 under the action of gravity and at substantial atmospheric pressure. The temperature of the feed polyisocyanate can be maintained within the desired range by providing additional heat, if necessary, during the passage of the polyisocyanate down the column 2. This can be accomplished by providing said column 2 with a heating jacket (not shown). The polyisocyanate collects in the base of the column 2 and is removed therefrom via exit port 14 to an appropriate storage area. Preferably, the isocyanate removed from the exit port 14 is subjected to cooling to lower its temperature to the order of about 160°F or lower, before being transferred to the storage area.

The inert gas is fed, via heat exchanger 16 in which it is heated to a temperature within the range set forth above, to inlet port 18 in the lower part of the column. The inert gas so introduced passes upwardly through the packing 4 in which it comes into intimate contact with the downwardly flowing polyisocyanate. The inert gas exits from the upper part of the column 2 via exit port 20 and is passed to a condenser or scrubber in which any entrained isocyanate or chlorine containing impurities are separated from the inert gas. The latter is then, if desired, recycled as inert gas feed via heat exchaner 16.

The process of the invention will now be illustrated further by reference to specific examples showing the reduction of acidity and hydrolyzable chloride of a polymethylene polyphenyl polyisocyanate. The procedure shown schematically in the FIGURE appended hereto was employed. A jacketed column of inside diameter four inches was employed and was packed initially to a height of 7.5 feet with ⅝ inch ceramic Intalox saddles; subsequently, the height of packing was increased to 15 feet. The column was provided at its upper end with an inlet tube for isocyanate feed; the tube delivered the feed to a liquid spreading device on top of the packing layer in the column. The top of the column was also provided with an exit tube which led to a gas scrubber tower. The column was provided at its lower end, at a point below the bottom retaining plate for the packing, with an inlet port for nitrogen gas. An exit port at the base of the column was provided for removal of treated liquid isocyanate to a cooling zone and then to a storage area.

The feed polyisocyanate used in the following experiment was a polymethylene polyphenyl polyisocyanate containing approximately 50 percent by weight of methylenebis(phenyl isocyanate), having an isocyanate equivalent of 134.7, a hot acid value of 0.14, a hydrolyzable chloride content of 0.20, and a viscosity of 230 cps at 25°C. A series of five runs was carried out in a first experiment in which the rate of feed of nitrogen was maintained constant at 135 cu ft/hr and the polyisocyanate feed rate was varied over a wide range. The various operating conditions in these runs are tabulated below together with analytical data on the polyisocyanate recovered from the base of the column when a steady state had been reached in each run.

of the invention resulted in a substantial reduction in hydrolyzable chloride and hot acidity. The treatment had no significant effect on viscosity or isocyanate equivalent of the feed polyisocyanate.

In a second experiment involving 5 runs, the packing in the column was increased to 15 feet of ⅝ inch Intalox saddles, the feed rate of nitrogen was maintained constant, and the isocyanate feed rate was varied. The operating conditions and analytical data on treated isocyanate taken at a steady state are summarized in Table II below. The feed polyisocyanate was a polyphenyl polymethylene polyisocyanate containing approximately 50 percent by weight of methylenebis(phenyl isocyanate), having an isocyanate equivalent of 134.9, a viscosity of 220 cps at 25°C, a hot acidity of 0.15, and a hydrolyzable chloride content of 0.16.

TABLE I

| Operating Conditions | Run 1 | 2 | 3 | 4 | 5 |
|---|---|---|---|---|---|
| Isocyanate feed rate lbs/hr | 80 | 110 | 135 | 25 | 65 |
| Isocyanate feed temp °F | 389 | 361 | 353 | 418 | 401 |
| Nitrogen feed rate cu ft/hr | 135 | 135 | 135 | 135 | 135 |
| Nitrogen feed temp °F | 342 | 333 | 336 | 351 | 346 |
| Column jacket oil temp °F | 437 | 441 | 434 | 437 | 434 |
| Analytical Data on Treated Isocyanate | | | | | |
| Isocyanate equivalent | 135.1 | 134.7 | 134.7 | 135.9 | 135.3 |
| Viscosity cps at 25°C | 208 | 215 | 200 | 244 | 214 |
| Hot acidity % HCl | 0.05 | 0.06 | 0.07 | 0.03 | 0.04 |
| Hydrolyzable chloride % | 0.096 | 0.12 | 0.11 | 0.07 | 0.08 |
| % Reduction in Hot Acidity of feed | 64 | 57 | 50 | 79 | 71 |
| % Reduction in hydrolyzable chloride of feed | 52 | 40 | 45 | 65 | 60 |

TABLE II

| Operating Conditions | Run 1 | 2 | 3 | 4 | 5 |
|---|---|---|---|---|---|
| Isocyanate feed rate lbs/hr | 100 | 60 | 85 | 22 | 125 |
| Isocyanate feed temp °F | 375 | 400 | 389 | 421 | 368 |
| Nitrogen feed rate cu ft/hr | 135 | 135 | 135 | 135 | 135 |
| Nitrogen feed temp °F | 355 | 358 | 353 | 366 | 357 |
| Column jacket oil temp °F | 442 | 441 | 442 | 443 | 447 |
| Average column temp °F | 421 | 416 | 422 | 389 | 428 |
| Analytical Data on Treated Isocyanate | | | | | |
| Isocyanate equivalent | 136.0 | 135.9 | 135.8 | 136.6 | 135.7 |
| Viscosity cps at 25°C | 212 | 212 | 212 | 247 | 191 |
| Hot acid % HCl | 0.036 | 0.027 | 0.026 | 0.024 | 0.039 |
| Hydrolyzable chloride % | 0.076 | 0.063 | 0.071 | 0.056 | 0.071 |
| % Reduction in hot acidity of feed | 76 | 82 | 83 | 84 | 74 |
| % Reduction in hydrolyzable chloride of feed | 53 | 61 | 57 | 65 | 57 |

It will be seen from the above results that treatment of the isocyanate in each of the runs using the process The above results again show a substantial reducton in both hydrolyzable chloride and hot acidity of the feed polyisocyanate without any significant change in isocyanate equivalent or viscosity of the latter.

In a third experiment, four runs were carried out in which the feed rates of isocyanate and nitrogen were maintained constant but the column temperature was varied. The packing in the column was 15 feet of ⅝ inch Intalox saddles. The feed polyisocyanate was the same as that used in the second experiment described above.

The operating conditons and analytical data on treated isocyanate taken at a steady state are summarized in TABLE III below.

TABLE III

| Operating Conditions | Run 1 | 2 | 3 | 4 |
|---|---|---|---|---|
| Isocyanate feed rate lbs/hr | 90 | 80 | 90 | 90 |
| Isocyanate feed temp °F | 362 | 366 | 384 | 399 |
| Nitrogen feed rate cu ft/hr | 135 | 135 | 135 | 135 |
| Nitrogen feed temp °F | 310 | 329 | 340 | 359 |
| Column (average) temp °F | 367 | 398 | 415 | 434 |
| Analytical Data on Treated Isocyanate | | | | |
| Isocyanate equivalent | 135.4 | 135.6 | 135.6 | 136.2 |
| Viscosity cps at 25°C | 199 | 209 | 204 | 218 |
| Hot acidity % HCl | 0.06 | 0.06 | 0.04 | 0.04 |
| Hydrolyzable chloride % | 0.08 | 0.07 | 0.07 | 0.07 |
| % Reduction in Hot Acidity of feed | 60 | 60 | 73 | 73 |
| % Reduction in Hydrolyzable chloride of feed | 50 | 56 | 56 | 56 |

Again it will be seen that treatment of the isocyanate in accordance with the process of the invention produced substantial reduction in hydrolyzable chloride content and acidity without causing any significant change in viscosity or isocyanate equivalent.

In a fourth experiment four runs were carried out in which the nitrogen feed rate was varied while all the other variables were maintained constant. The packing in the column was 7.5 feet of ⅝ inch Intalox saddles. The feed polyisocyanate was a polyphenyl polymethylene polyisocyanate containing approximately 50 percent by weight of methylenebis(phenyl isocyanate) having an isocyanate equivalent of 134.5, a viscosity of 219 centipoises at 25°C, a hydrolyzable chloride content of 0.14, and a hot acidity value of 0.11.

The operating conditions and analytical data on treated isocyanate taken at a steady state are summarized in TABLE IV below.

TABLE IV

| Operating Conditions | Run 1 | 2 | 3 | 4 |
|---|---|---|---|---|
| Isocyanate feed rate lbs/hr | 85 | 80 | 84 | 82 |
| Isocyanate feed temp °F | 383 | 389 | 388 | 387 |
| Nitrogen feed rate cu ft/hr | 30 | 60 | 90 | 135 |
| Nitrogen feed temp °F | 283 | 323 | 336 | 342 |
| Column jacket oil temp °F | 441 | 447 | 434 | 441 |
| Analytical Data on Treated Isocyanate | | | | |
| Isocyanate equivalent | 134.6 | 134.0 | 134.5 | 134.6 |
| Viscosity cps at 25°C | 190 | 193 | 195 | 199 |
| Hot Acidity % HCl | 0.07 | 0.06 | 0.05 | 0.05 |
| Hydrolyzable chloride % | 0.09 | 0.08 | 0.09 | 0.08 |
| % Reduction in Hot Acidity of feed | 36 | 45 | 55 | 55 |
| % Reduction in Hydrolyzable chloride of feed | 36 | 43 | 36 | 43 |

It will be seen that substantial reductions in hydrolyzable chloride content and hot acidity of the isocyanate were achieved without any significant change in viscosity or isocyanate equivalent of the feed.

The process of the invention, as can be seen from the above illustrative examples, enables one to achieve substantial reductions in acidity and hydrolyzable chloride without causing any significant (and undesirable) changes in the composition of the isocyanate which is treated. Further the process of the invention has the additional advantage that it can be incorporated readily, as one of the final steps, into a continuous process for the preparation of polyisocyanates. Other advantages include economy and relative simplicity of operation.

We claim:

1. A process for lowering the acidity and hydrolyzable chloride content of a polymethylene polyphenyl polyisocyanate containing from 35 to 85 percent methylenebis(phenyl isocyanate) without concomitantly causing any significant change in viscosity or oligomeric distribution in said polyisocyante which process comprises passing said polyisocyanate, in the liquid state at a temperature within the range of about 350°F to about 450°F, downwardly through a packed column and passing a stream of inert gas counter-currently with respect to said isocyanate, the pressure in said column being substantially atmospheric, and the average residence time of said isocyanate in said column being within the range of 1 to 10 minutes.

2. The process of claim 1 wherein the inert gas is nitrogen.

* * * * *